US005757258A

United States Patent [19]

Krichtafovitch et al.

[11] Patent Number: 5,757,258

[45] Date of Patent: May 26, 1998

[54] HIGH VOLTAGE ISOLATING TRANSFORMER MODULE WITH SUBSTRATES SEPARATED BY A FIXED DISTANCE

[75] Inventors: Igor A. Krichtafovitch, Kirkland; Irina Z. Sinitsyna, Bothell, both of Wash.

[73] Assignee: International Power Group, Inc., Woodinville, Wash.

[21] Appl. No.: 656,162

[22] Filed: May 31, 1996

Related U.S. Application Data

[63] Continuation-in-part of Ser. No. 460,072, Jun. 2, 1995.

[51] Int. Cl.[6] .......................... H01F 27/06; H01F 27/02; H02M 1/00

[52] U.S. Cl. .......................... 336/65; 336/92; 363/146

[58] Field of Search .......................... 336/65, 90, 92, 336/184, 210; 363/17, 144, 147, 146

[56] References Cited

U.S. PATENT DOCUMENTS

| | | | |
|---|---|---|---|
| 2,674,721 | 4/1954 | Jackson et al. | 336/134 |
| 3,323,091 | 5/1967 | Hibbits | 336/84 R |
| 3,986,080 | 10/1976 | Sato | 361/699 |
| 4,117,436 | 9/1978 | MacLennan | 336/65 |
| 4,347,490 | 8/1982 | Peterson | 336/60 |
| 4,658,091 | 4/1987 | McCarthy | 174/52.2 |
| 4,661,792 | 4/1987 | Watkins | 336/65 |
| 4,800,356 | 1/1989 | Ellis | 336/184 |
| 4,864,486 | 9/1989 | Spreen | 363/126 |
| 5,004,974 | 4/1991 | Cattaneo et al. | 324/117 R |
| 5,225,971 | 7/1993 | Spreen | 363/17 |
| 5,229,652 | 7/1993 | Hough | 307/104 |
| 5,293,145 | 3/1994 | Rynkiewicz | 336/65 |
| 5,390,349 | 2/1995 | Joshi et al. | 455/330 |
| 5,391,835 | 2/1995 | Yao et al. | 174/18 |
| 5,594,402 | 1/1997 | Kritchtafovitch et al. | 336/65 |

*Primary Examiner*—Peter S. Wong
*Assistant Examiner*—Bao Q. Vu
*Attorney, Agent, or Firm*—Christensen O'Connor Johnson & Kindness PLLC

[57] ABSTRACT

A high voltage transformer module (50) having a pair of high voltage substrates (64, 66) and a pair of low voltage substrates (62, 68) on which high and low voltage components are respectfully mounted. Mounted between the substrates are a plurality of transformers (92*a*, 92*b*, . . . 92*n*). In a preferred embodiment, each of the plurality of transformers is coupled to a full bridge rectifier (102*a*, 102*b*, . . . 102*n*) and the outputs of the rectifiers connected so that an output voltage produced by each transformer/rectifier pair is summed to produce a total output voltage for the high voltage transformer module. Electrical shorts are prevented within the module by fixedly mounting the substrates in the casing and by filling the cavities formed between the substrates with insulation having a high breakdown voltage. The components on the high voltage substrates are both physically and electrically isolated from the components on the low voltage substrates.

40 Claims, 8 Drawing Sheets

HIGH VOLTAGE ISOLATING TRANSFORMER MODULE WITH SUBSTRATES SEPARATED BY A FIXED DISTANCE

RELATIONSHIP TO OTHER APPLICATIONS

This application is a continuation-in-part of U.S. patent application Ser. No. 08/460,072, filed Jun. 2, 1995, the benefit of the filing of which is hereby claimed under 35 U.S.C. §120.

FIELD OF THE INVENTION

The present invention relates generally to transformers, and more specifically to a transformer module for isolating high and low voltage components.

BACKGROUND OF THE INVENTION

When designing high voltage transformers, it is important to maintain adequate distance between the high voltage components in the transformer and the low voltage components in the transformer in order to prevent shorts. A cross-section of a typical high voltage transformer having multiple secondary windings is shown in FIG. 1. At its simplest level, high voltage transformer 20 includes a two-piece ferromagnetic core **22*a* and 22*b*, primary windings 24, a plurality of secondary windings 26*a*, 26*b*, . . . 26*f*, and insulation 28. The primary windings are constructed of a continuous conductive wire that is wrapped around the two legs of the core a desired number of turns. Similarly, the plurality of secondary windings 26*a*, 26*b*, . . . 26*f* are each constructed of a continuous conductive wire wrapped around a cylindrical nonconducting spool (not shown) a desired number of turns. The plurality of secondary windings surround the primary windings and the core, but are spaced a distance away from the primary windings by intervening insulation 28. As is well known in the art, an alternating voltage applied across the primary winding will be stepped up by the transformer proportionally to the ratio of the number of turns in each secondary winding with respect to the number of turns in the primary winding. The transformer in FIG. 1 also contains a plurality of diodes 30*a*, 30*b*, . . . 30*f* that are integrally formed with the transformer and connected in a bridge configuration across the output of a corresponding secondary winding 26*a*, 26*b*, . . . 26*f***. A stepped-up and rectified voltage is therefore produced by each secondary winding/rectifier pair.

While the transformer configuration shown in FIG. 1 may be readily adapted for low-voltage applications, when the configuration is used for high voltage applications (in the kVolt range), several shortcomings of the design become apparent. One disadvantage of the traditional design is that design tolerances in the transformer become very critical. When voltages in the kVolt range are being generated by transformer 20, a first distance 32 between the primary and secondary windings, as well as a second distance 34 between the windings and the external surface of the transformer must be carefully controlled. If the amount of insulation 28 is insufficient for the voltage applied across the insulation, the insulation may break down causing the primary winding to short to the secondary winding and leading to a transformer failure. Similarly, if the amount of insulation between the secondary winding and the external surface of the transformer is insufficient, a short may occur from the secondary winding to a point outside the transformer. In addition to potentially damaging the transformer, the external short could put individuals or other equipment near the transformer at risk.

Moreover, in high voltage applications, the insulation in the transformer has a tendency to degrade due to the extreme swings in the generated output voltage. Insulation 28 contains dipoles that will align themselves with the alternating electric field generated as current flows through the winding. The application of an alternative current (AC) voltage across the winding therefore causes the dipoles to twist in response to the changing polarity of the input signal. The twisting motion of the dipoles is more pronounced the higher the generated output voltage. In high voltage applications, the twisting of the dipoles heats the insulation and causes the insulation to degrade. As the insulation degrades, the resistance of the insulation falls and increases the likelihood that a short will occur. Ultimately, the performance of the transformer is compromised and the transformer must be replaced.

Another disadvantage of the traditional transformer design is that in high voltage applications, the secondary winding of the transformer typically must have a large number of turns in order to step up the voltage to the desired amplitude. As the number of turns in the secondary winding increases, so does the reflected capacitance of the secondary winding. Those skilled in the art will recognize that to efficiently drive a large capacitive load, it is desirable to place an inductor in series with the load. As the reflected capacitance of the secondary winding of the transformer increases, it is therefore necessary to include a progressively larger inductor in the system incorporating the transformer. In addition to becoming prohibitively expensive, the inductor will increase the size of the system incorporating the transformer.

The present invention is directed to a transformer construction for high voltage applications that overcomes or minimizes the above-mentioned disadvantages.

SUMMARY OF THE INVENTION

The present invention provides a high voltage isolating transformer module having high voltage components that are physically and electrically isolated from low voltage components. The high voltage components are mounted on a pair of inner high voltage substrates, and the low voltage components are mounted on a pair of outer low voltage substrates. Multiple transformers are mounted between the substrates in a single high voltage transformer module. Each transformer has a pair of primary windings, a ferromagnetic core, and a pair of secondary windings. The core of each transformer is split, half being attached to each of the low voltage substrates, with two legs of each half abutting two corresponding legs of the other half. A cylindrical primary winding is wrapped around each leg of the core. The low-voltage substrates are separated a fixed distance apart by having their margins fitted in slots of a casing.

Mounted between the low voltage substrates at a fixed distance is a pair of high voltage substrates. The pair of secondary windings of each transformer stage is attached to the pair of high voltage substrates. The pair of high voltage substrates is further formed with a plurality of holes so that, when mounted in the casing between the low voltage substrates, the core and primary windings of each transformer are encased by the secondary windings of each transformer. When the primary winding and the secondary winding have a different number of turns, an AC voltage applied across the primary winding induces a stepped-up or stepped-down voltage across the secondary winding.

In accordance with one aspect of the invention, a construction that ensures accurate and appropriate spacing of the high voltage and low voltage substrates is disclosed. Each substrate is mounted in a set of slots constructed in a bottom casing. The slots lock the substrates in a desired position and define an appropriate spacing between adjacent substrates. The cavities formed between each substrate are then filled with insulation having a high breakdown voltage. By appropriate selection of the distance between each substrate, the high voltage components are electrically isolated from the low voltage components to a degree sufficient to prevent shorting.

In accordance with another aspect of the invention, the outputs from each transformer may be connected to a rectifier. The rectifiers are then connected in cascode so that the voltage produced by each transformer/rectifier pair is summed with the other rectified outputs to generate a total output voltage for the high voltage transformer module. Several advantages arise from a construction wherein each transformer in the high voltage transformer module must only produce a relatively small component of the total output voltage. The deleterious effects of the voltage swings on the insulation in the transformer are minimized, increasing the life of the transformer and reducing the probability of catastrophic transformer failure. The amount of voltage amplification that must be provided in each stage may also be reduced. Less turns are required in the secondary windings of the transformer, decreasing the reflected capacitance of each transformer and making the transformer easier to drive with a smaller inductor. The reduced inductor necessary to drive the transformer minimizes the total size of the high voltage transformer module.

In accordance with still another aspect of the invention, the number of transformers in each high voltage transformer module may be varied to suit a particular application. Transformers may be added to generate a greater total output voltage, or transformers may be eliminated to generate a smaller total output voltage. The flexibility of the design allows an output voltage range to be closely tailored to produce a desired voltage necessary for the application.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

Figure 1:
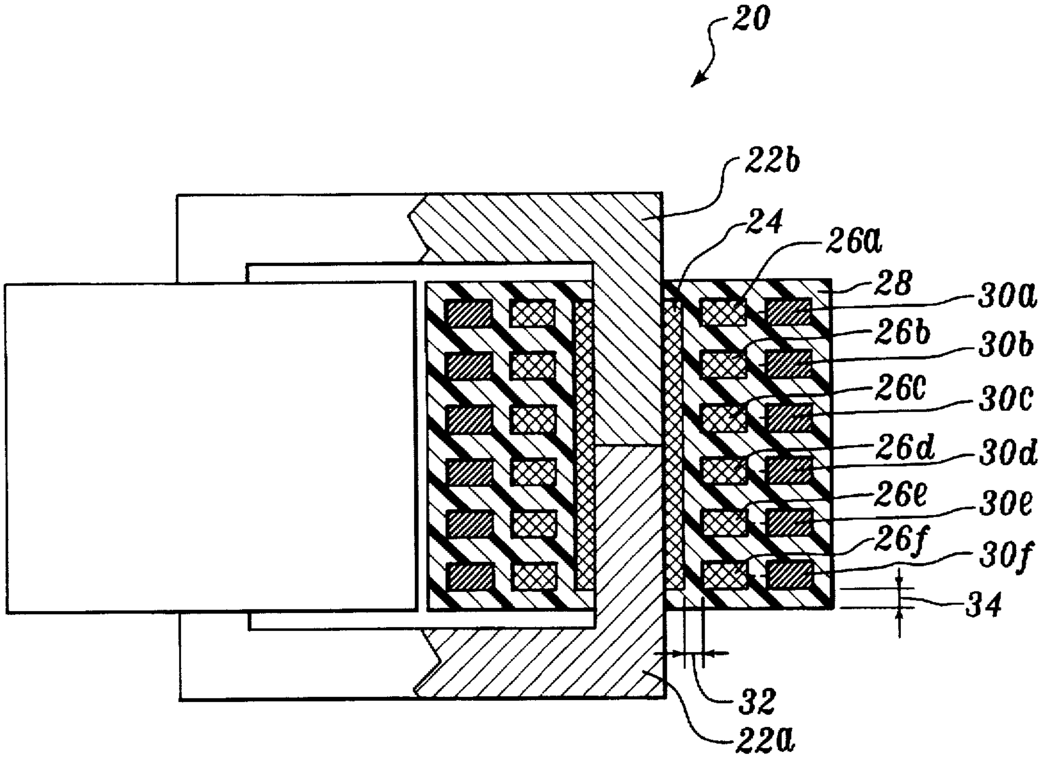
Fig. 1. (PRIOR ART)
FIG. 1 is an axial cross section of a representative prior art single stage transformer.
Figure 2:
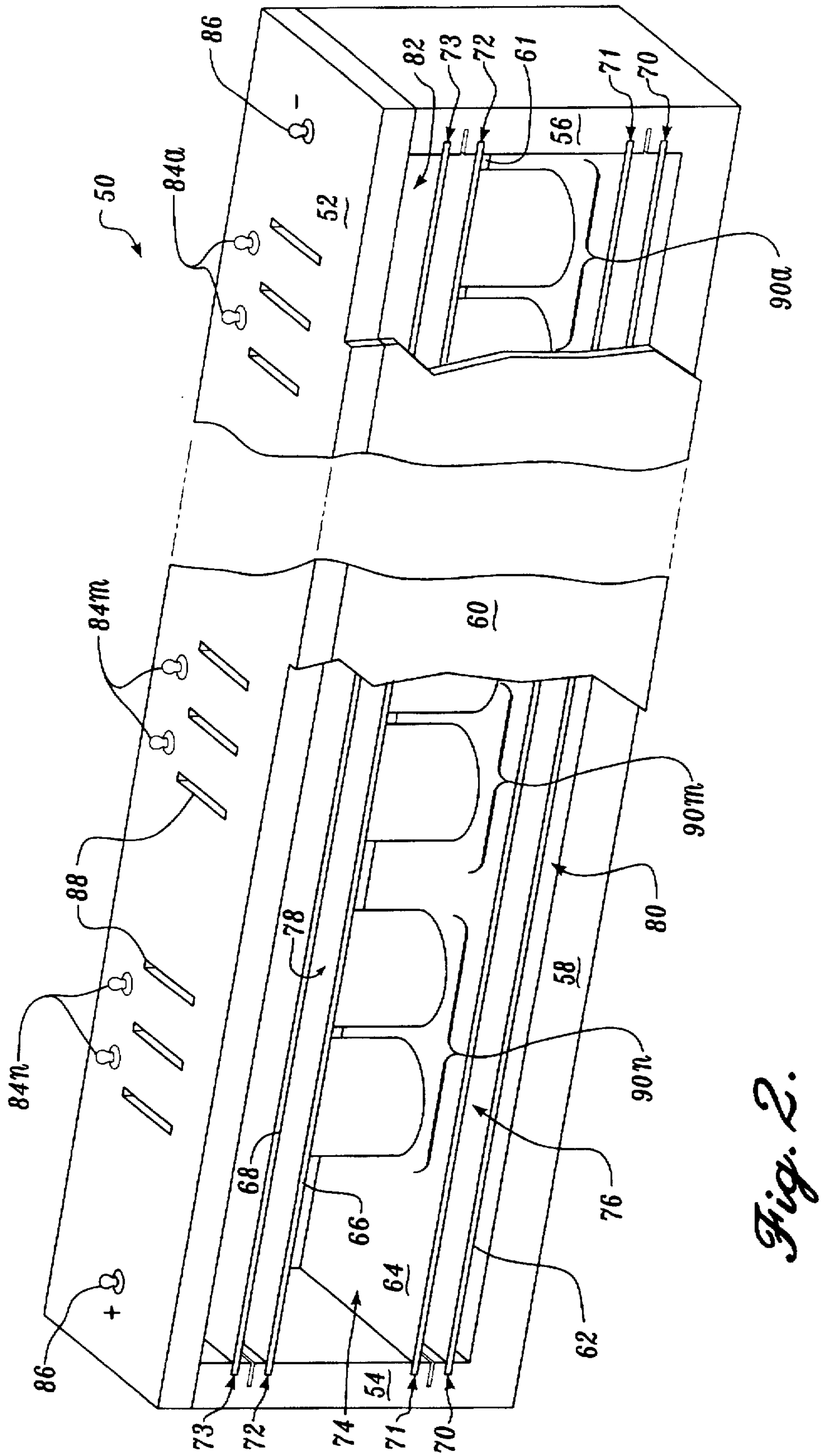
FIG. 2 is a top perspective of a high voltage transformer module formed in accordance with the present invention with parts broken away.

As shown in FIG. 2, a high voltage transformer module 50 constructed in accordance with the present invention includes a bottom casing having a left end wall 54, a right end wall 56, a bottom wall 58, a front wall 60, and a back wall 61. A cover plate 52 is fitted to the top of the bottom casing. Cover plate 52 may be permanently sealed to the bottom casing, or attached with fasteners to allow access to the inside of module 50 through the top. The walls that form the bottom casing are sealed so that fluid contained within the module will not leak out. Similarly, the seam between the cover plate and the bottom casing may be sealed. If a pressure build-up is expected within module 50, vents 88 may be incorporated in the cover plate to allow gasses to escape during operation. The cover plate and bottom casing of the module are constructed of a nonconductive material having a high breakdown voltage. In a preferred embodiment of the invention, the module casing is constructed of phenolic resin.

Figure 3:
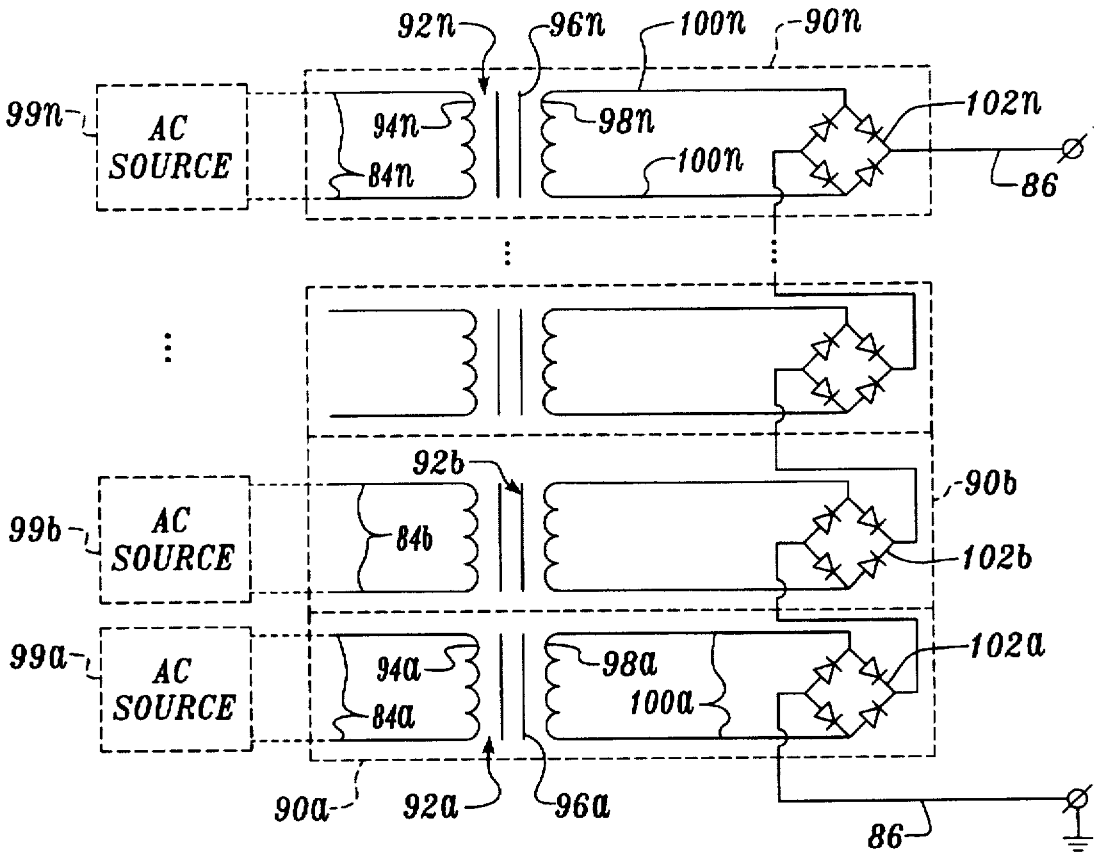
FIG. 3 is a schematic diagram of the high voltage transformer module of FIG. 2.

Contained inside and integral with module 50 are multiple high voltage transformers. For the purposes of this application, the term "transformer" means an electrical device which, by electromagnetic induction, transforms electrical energy from one or more circuits to one or more other circuits at the same frequency but usually at a different voltage and current value. In a preferred embodiment of the invention, each of the transformers is connected to a rectifier and the output voltages generated by each transformer/rectifier pair are summed to produce a total output voltage for the high voltage transformer module. The electrical connections between transformers and rectifiers may be better understood with reference to FIG. 3. FIG. 3 is a schematic of a preferred embodiment of the module that consists of a number of stages ***90a*, *90b*, . . . *90n*, each stage including a transformer *92a*, *92b*, . . . *92n* and a rectifier *102a*, *102b*, . . . *102n*. Although the construction of first stage *90a* will be discussed below, each of the other stages in the transformer module is constructed in a similar manner. The discussion below therefore applies equally to stages *90b*, *90c*, . . . *90n***.

In first stage *90a*, transformer *92a* consists of a primary winding *94a*, a core *96a*, and a secondary winding *98a*. The primary winding *94a* of the transformer is connected to a pair of input terminals *84a*, allowing a voltage to be applied across the primary winding. One source of the voltage may be an alternating current (AC) source *99a*, shown diagramatically in broken line. The operation of transformer *92a* is well known to those skilled in the art of power supplies. An AC voltage applied across the input terminals *84a* is stepped up or down according to the ratio of the number of turns in the secondary winding to the number of turns in the primary winding. The stepped-up or stepped-down voltage appears across secondary winding *98a* and is applied across a rectifier *102a* via a pair of lines *100a*. In a preferred embodiment of the invention, rectifier *102a* is a full wave bridge constructed of four diodes. The rectifier rectifies the stepped-up AC output voltage from transformer *92a* and produces a rectified direct current (DC) output voltage across the output of the rectifier.

Stages ***90b*, *90c*, . . . *90n* are constructed identically to first stage *90a*. The outputs from bridge rectifiers *102a*, *102b*, . . . *102n* in each stage are cascoded so that the voltage produced at the output of each stage is summed with all the other stages and the sum output voltage provided on a pair of output terminals 86**. The output voltage from the preferred embodiment of the high voltage transformer module is therefore equivalent to the sum of the voltage across each of the stages. For example, if each of the stages produced an output voltage of 2,000 volts, and ten stages were cascoded, the output voltage produced by the high voltage transformer module would be 20,000 volts. It will be appreciated that the construction of the high voltage transformer module disclosed herein is preferably incorporated in the power supply disclosed in U.S. patent application Ser. No. 08/416,997, entitled "High Voltage Power Supply Having Multiple High Voltage Generators," commonly assigned and expressly incorporated herein by reference.

Returning to FIG. 2, the components of each stage 90*a*, 90*b*, . . . 90*n* are contained within high voltage transformer module 50. Each end wall 54 and 56 has a pair of inwardly opening lower slots or grooves 70 and 71, and a pair of inwardly opening upper slots or grooves 72 and 73. All of the slots are parallel, and each slot opens toward and is aligned with a corresponding slot on the opposing end wall. Suspended between each opposing pair of slots are two substrates. Lower slots 70 on the left end wall and the right end wall support a low voltage substrate 62, and lower slots 71 on the left end wall and the right end wall support a high voltage substrate 64. With the opposite end margins of the substrates securely within the lower slots, low voltage substrate 62 is parallel with high voltage substrate 64 over the length of module 50. Similarly, upper slots 72 on the left end wall and the right end wall support a high voltage substrate 66, and upper slots 73 support a low voltage substrate 68. When the substrate margins are positioned in the slots, high voltage substrate 66 is parallel with low voltage substrate 68. The high and low voltage substrates are each constructed of nonconductive material having a high breakdown voltage. In a preferred embodiment of the invention, the substrates are constructed of phenolic resin.

The slots formed in the end walls maintain the high voltage and low voltage substrates at a fixed distance from each other and from the bottom and the top of the module casing. As a result, numerous cavities are formed within module 50. An inner cavity 74 is formed between the high voltage substrates 64 and 66. The distance between the high voltage substrates is fixed by the position of slots 71 and 72 thereby defining the size of the inner cavity. A cavity is also formed between each high voltage and low voltage substrate pair. A first intermediate cavity 76 is formed between high voltage substrate 64 and low voltage substrate 62. A second intermediate cavity 78 is formed between high voltage substrate 66 and low voltage substrate 68. The distance between slots 70 and 71 defines the upright dimension (thickness) of first intermediate cavity 76, and the distance between slots 72 and 73 defines the upright dimension (thickness) of second intermediate cavity 78. Additional outer cavities are formed between each low voltage substrate and the top or bottom of the module. A first outer cavity 80 is formed between low voltage substrate 62 and bottom wall 58 of module 50. Similarly, a second outer cavity 82 is formed between low voltage substrate 68 and cover plate 52 of module 50. The thickness of the first outer cavity is fixed by the distance between lower slots 70 and the bottom of the module, and the thickness of the second outer cavity is fixed by the distance between upper slots 73 and the top of the module.

It will be appreciated that the slots are accurately formed in the side walls so that the high voltage substrates and the low voltage substrates are maintained an equal distance apart over the length of the module. If necessary, additional slots or other support may be incorporated in the front wall or the back wall of the module to ensure that appropriate spacing is maintained between the high and low voltage substrates. It will also be appreciated that once left end wall 54 and right end wall 56 are fixed in place, the substrates are locked in position between each wall. The module may be turned or moved without concern that the distance between the high and low voltage substrates will change due to the motion of the module. Other supports could be envisioned that would also fix the substrates with respect to each other. For example, brackets or other members could be affixed to the walls of the casing and to the substrates. Alternately, a freestanding support structure could be constructed that would fix the substrates within the case but away from the walls. Any support structure must maintain a desired distance between the substrates, as well as between the substrates and surrounding components or case.

Supported between the high voltage substrates and the low voltage substrates are the component parts of each stage of the high voltage transformer module. Module 50 shown in FIG. 2 contains stages 90*a*, 90*b*, . . . 90*n*. In a preferred embodiment discussed below, ten stages are incorporated in each module. It will be appreciated, however, that the number of stages may be increased or reduced depending on the voltage needed for a particular application. As also shown in FIG. 3, each stage of the transformer has a corresponding pair of input terminals 84*a*, 84*b*, . . . 84*n*, wherein an input voltage may be applied across the transformer. In the representative module shown, the input terminals are mounted on the cover plate of the module. It will be appreciated, however, that the input terminals may be located on any of the walls of module 50 where they may conveniently be accessed. Module 50 also contains a pair of output terminals 86 that are located on the cover plate of the module. The voltage applied across each stage of the high voltage transformer module is stepped up and summed with the other stages to produce an output voltage across output terminals 86. While output terminals 86 are shown mounted on the cover plate of module 50, the output terminals may similarly be mounted at any point on module 50 that is conveniently accessible.

Figure 4:
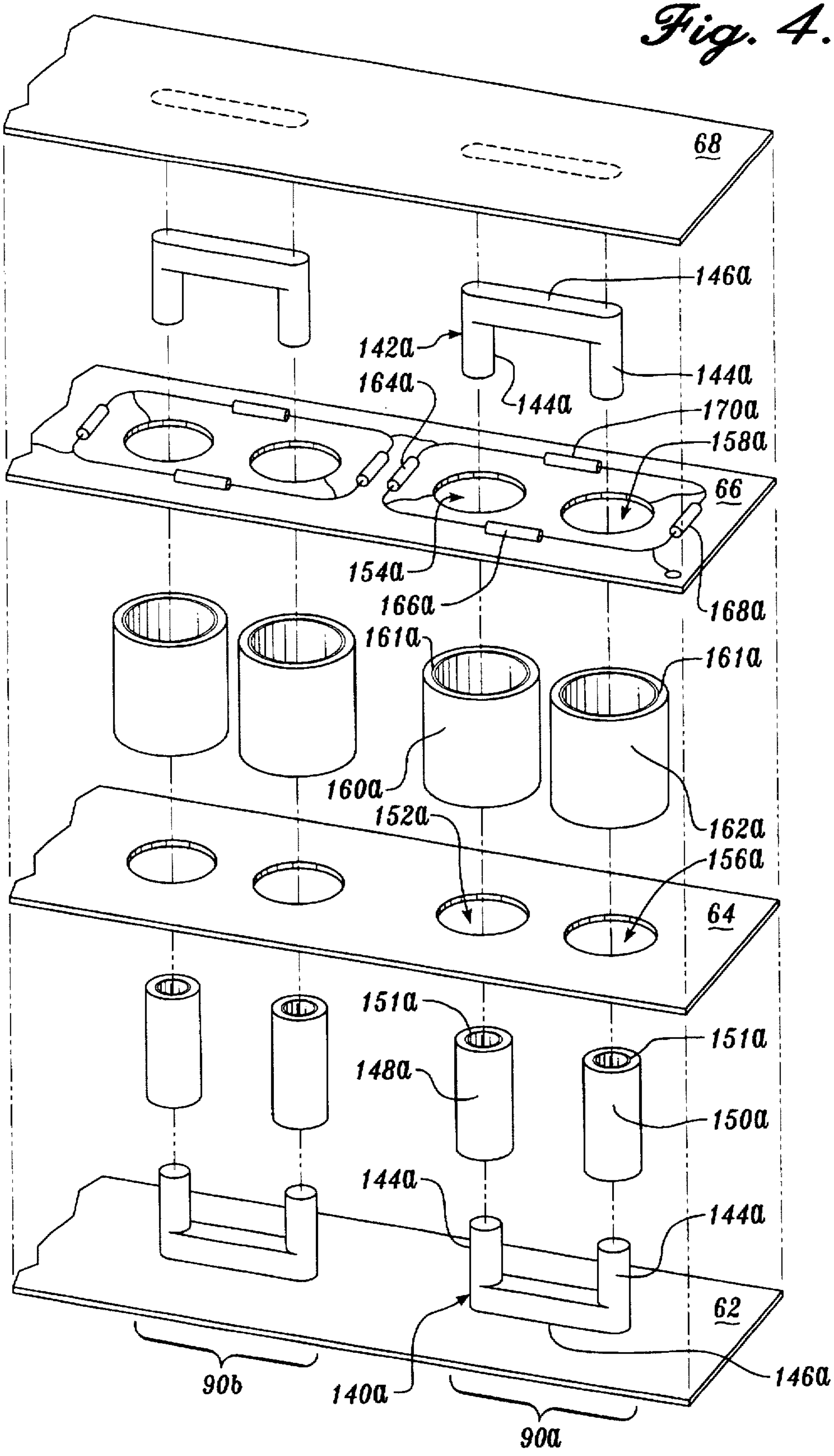
FIG. 4 is a top perspective of two stages of the high voltage transformer module with the component parts shown in exploded relationship.
Figure 5:
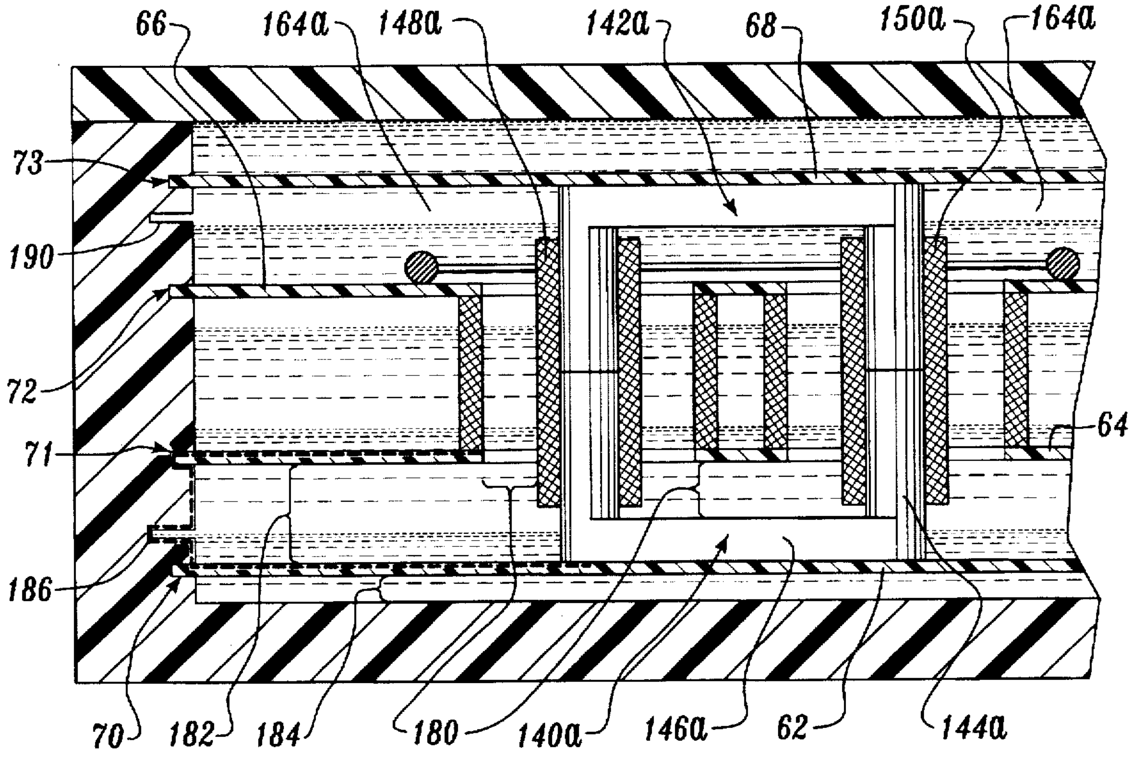
FIG. 5 is a fragmentary perspective of a single stage of the high voltage transformer module.

The mounting of the transformer components on the high and low voltage substrates is best seen in FIGS. 4 and 5. FIG. 4 is a top perspective of first stage 90*a* and second stage 90*b* of the high voltage transformer module with the components shown in exploded relationship. FIG. 5 is a fragmentary view of last stage 90*n*, with the component parts assembled and mounted on the high and low voltage substrates. The discussion below focuses on the construction of first stage 90*a*, but it will be appreciated that the description of the first stage applies equally to the other stages in the transformer module.

The transformer in first stage 90*a* consists of a first core 140*a* mounted on low voltage substrate 62 and a second core 142*a* mounted on low voltage substrate 68. Each core is substantially "U" shaped, with a base or web 146*a* that is connected to the substrate and two legs 144*a* that extend outward, perpendicularly from the substrate. Although the shape of the core may vary, in a preferred embodiment of the transformer module each leg is substantially cylindrical. The legs of first core 140*a* and second core 142*a* have approximately the same cross-section so that the inner ends of the cores abut contiguously when they are brought together as shown in FIG. 5. The cores are manufactured of a ferromagnetic material, in a preferred embodiment U64, 3C80 manufactured by Philips.

Primary windings 148*a* and 150*a* are positioned over cores 140*a* and 142*a*. As will be appreciated by one skilled in transformer construction, the primary windings may be constructed using any of a number of different techniques. In one embodiment of the high voltage transformer module, the primary windings are constructed of a number of turns of conductive wire that are wrapped around tubular nonconductive spools 151*a*. The nonconductive spools may be formed of electrically insulating and non-magnetic material such as nylon or rynite. The nonconductive spools are sized to fit snugly over the legs of cores 140*a* and 142*a*, and to extend from the base of one core to the base of the other. The number of turns of wire that are wrapped around the nonconductive spool is determined by the desired amount of voltage increase that is to be generated by each transformer. In a preferred embodiment of the invention, the primary winding has 90 turns.

The wire used to manufacture the primary winding must be selected so that it is sufficient to carry the current that is expected to flow through the primary winding. A suitable wire that may be used to construct the primary winding has a gauge of AWG No. 12. The wire around primary winding 148*a* and primary winding 150*a* is continuous, so that current will flow first through one winding and then through the other. It will be appreciated that various other techniques for constructing primary windings 148*a* and 150*a* are well known in the art of manufacturing transformers.

When fully assembled, the wire in primary windings 148*a* and 150*a* completely surrounds the legs of U-shaped cores 140*a* and 142*a*. Moreover, the cores and the primary windings of each stage are each mounted on low voltage substrates 62 and 68, isolating the low voltage components from the high voltage components as described in additional below.

When assembled, the cores and the primary windings on the cores extend through the components that are attached to the high voltage substrates, i.e., secondary windings 160*a* and 162*a*. As will be appreciated by one skilled in transformer construction, the secondary windings may be manufactured using any of a number of different techniques. In a preferred embodiment of the high voltage transformer module, the secondary windings are constructed of a number of turns of conductive wire that are wrapped around a tubular nonconductive spool 161*a*. The wire forming the secondary winding 160*a* and 162*a* is continuous such that current flowing through secondary winding 160*a* will subsequently flow through secondary winding 162*a*. The nonconductive spools are sized so that primary windings 148*a* and 150*a* fit inside the spools, with sufficient room to create an annular space between the primary windings and the secondary spools. The number of turns of wire that are wrapped around each nonconductive spool to make the secondary windings is determined by the desired amount of voltage increase that is to be generated by each stage. In a preferred embodiment of the invention, the secondary winding has 550 turns. The transformer therefore steps up the input voltage by a ratio of 550:90. As with the primary winding, the wire used to manufacture the secondary winding must be selected so that it is sufficient to carry the current that will flow through the secondary winding. Suitable wire that may be used to construct the secondary winding has a gauge of AWG No. 36.

A plurality of holes 152*a*, 154*a*, 156*a*, and 158*a* are integrally formed in high voltage substrate 64 and high voltage substrate 66. Each hole is approximately the same size as the inner diameter of the nonconductive spool that is used to construct the secondary windings. Each secondary winding spool is aligned over the associated hole so that, when the components on the high voltage substrates are assembled, a cylindrical space extends from high voltage substrate 64 through the respective secondary winding and through high voltage substrate 66. When assembled within the bottom casing of the module, the cylindrical space allows the primary windings to be suspended within the secondary windings. Primary winding 148*a* will therefore extend through hole 152*a*, secondary winding 160*a*, and hole 154*a*. Similarly, primary winding 150*a* will extend through hole 156*a*, secondary winding 162*a*, and hole 158*a*. The components are mounted on the high voltage and the low voltage substrates so that the axes of the primary and secondary windings are aligned, forming a uniform annular cavity between each primary and secondary winding. The relative spacing of all the components will be discussed in further detail below.

Attached to high voltage substrate 66 are four diodes 164*a*, 166*a*, 168*a*, and 170*a*, that collectively form full wave bridge rectifier 102*a*. The diodes are electrically connected to the secondary winding so that the voltage generated across the secondary winding is applied across the two input terminals of the bridge rectifier. In the preferred embodiment of the transformer module, the bridge rectifier 102*a* is connected in cascode with bridge rectifiers 102*b*, 102*c*, . . . 102*n* from each of the other stages so that the voltages produced across the output of each of the rectifiers are summed. While the preferred diode layout shown in FIG. 4 has the diodes surrounding holes 154*a* and 158*a* on substrate 66, it will be appreciated that the diodes may be positioned elsewhere on high voltage substrates 66 or on high voltage substrate 64.

When assembled, the high voltage components of each stage on high voltage substrates 64 and 66 are isolated from the low voltage components on low voltage substrates 62 and 68. The secondary windings of each transformer and the full bridge rectifiers of each stage are mounted on the high voltage substrates, and the primary windings and the cores of each transformer are mounted on the low voltage substrates. Additional components may be added to the high or low voltage substrates, depending on their operating voltages. The construction of module 50 and the inclusion of the transformer therefore isolates the components both physically and electrically.

After the components have been assembled, attached to the high and low voltage substrates, and fitted within the bottom casing, each cavity in module 50 is filled with insulation having a high electrical breakdown voltage. In a preferred embodiment of the invention, each cavity is filled with a liquid, preferably mineral oil or silicon oil. It will be appreciated, however, that other types of materials may be used to fill the cavities, including cast insulation, gasses, or compressed gasses such as $SF_6$. Sufficient liquid or other material is added to module 50 so that inner cavity 74, intermediate cavities 76 and 78, and outer cavities 80 and 82 are filled. The insulation completely surrounds the components of each stage, and isolates the high voltage substrates from the low voltage substrates. In particular, the annular cavity between the primary winding and the secondary winding is filled with the insulation to isolate the high voltage components from the low voltage components. The material is selected to provide sufficient isolation so that the expected voltage generated within each stage and throughout the high voltage transformer module will not short between the high voltage and the low voltage components. Additionally, the high or low voltage components should not short with the casing of the module.

The lengths of four paths are of critical importance in the design and construction of the high voltage transformer module. With reference to FIG. 5, a first path 180 is defined as the distance between the primary windings and the secondary windings of each transformer, or the distance between the secondary windings and the core of the transformer. The distance is dictated by the number of stages in the transformer, and the maximum output voltage that is to be generated. It will be appreciated that the voltage across the rectifier at each stage increases until the last stage in the chain. If, for example, 20,000 volts were to be generated by the cascode connection of ten stages, each stage may be responsible for generating 2,000 volts. However, the voltage potential between the last stage and ground would be equivalent to 20,000 volts. The length of first path 180 is therefore dictated by the 20,000 volt limitation, and may be determined by dividing the expected maximum voltage by the breakdown voltage of the insulation filling the annular space. The calculated length will be the same as the length determined by dividing the expected maximum voltage by the breakdown voltage of the insulation filling the space between the secondary winding and the core. In the preferred embodiment, mineral oil having a breakdown voltage of at least 10 kVolt/mm is used to fill the annular cavity between the windings and the cavity between the secondary winding and the core. At a minimum, the distance between the primary and secondary windings must be 20 kVolt/(10 kVolt/mm)=2 mm. In practice, the insulation must be at least two to three times the expected maximum voltage, because the electric field is not uniform between the primary and secondary windings. In a preferred embodiment, a first path length 180 of approximately 5 mm would be sufficient to prevent breakdown in a 20 kVolt high voltage transformer module having stages connected in cascode.

It will be appreciated that in FIG. 2 the low voltage stages on the right side of the figure progressively increase to the higher voltage stages on the left side of the figure. Theoretically, the first path length between the primary and secondary windings in each stage may therefore be unequal, with the lower voltage stages having a shorter first path length than the higher voltage stages. For convenience in construction, however, the first path length between the primary and secondary windings in each stage is uniformly set to the distance between the windings in the last stage. This provides sufficient distance to ensure that no shorting occurs between any of the components.

Returning to FIG. 5, a second path 182 is defined as the distance between the low voltage substrate and the high voltage substrate. The substrates must be suspended a sufficient distance apart so that a potential generated across the surface of each substrate will not short to the other substrate. The distance is determined by calculating the maximum voltage to be generated by the high voltage transformer module, and dividing by the breakdown voltage of the intervening insulation. As calculated above, if the total output voltage is 20 kVolt and the substrates are separated by mineral oil, the substrates should be positioned a minimum of 5 mm apart.

A third path 184 is defined as the distance between the low voltage substrate and the exterior case. Because the low voltage substrate will be at or near a very low potential, the path between the low voltage substrate and the outer case may typically be shorter than the other paths. In a preferred embodiment of the invention, the third path is approximately 2 mm.

Finally, a fourth path 186 (represented as a dashed line) is defined as the distance from the secondary winding to the core, in a path extending across the surface of the high voltage substrate, across the surface of the wall of the bottom casing, and across the surface of the low voltage substrate. Because the breakdown voltage across the surface of the substrates and casing is typically lower than the breakdown voltage of the insulation, fourth path 186 must be substantially longer than the other paths. To increase the fourth path length, additional slots or grooves 188 and 190 are cut into the left and right end walls to increase the distance that the voltage must drop across the surface of the walls. In the preferred embodiment, the breakdown voltage across the surface of the compound forming the substrates is on the order of 200–300 volts/mm. At a minimum, the fourth path length for last stage **90*n* of the preferred ten-stage high voltage transformer module should therefore be 20 kVolts/(200 volts/mm)=100 mm or approximately 10 cm. It will be appreciated that the potential between the secondary winding of last stage 90*n* and ground is much greater than the potential between the secondary winding of first stage 90*a* and ground. The last stage must therefore be located at a farther distance from the left end wall than the first stage is located from the right end wall. At a minimum, the fourth path length for first stage 90*a* should be 2 kVolts/(200 volts/mm)=10 mm. The general rule that the last stage must be farther from the respective end wall than the first stage applies regardless of the number of stages in the module. As shown in the representative module of FIG. 2, the distance between last stage 90*n* and left end wall 54 must be greater than the distance between first stage 90*a* and right end wall 56**.

Figure 6:
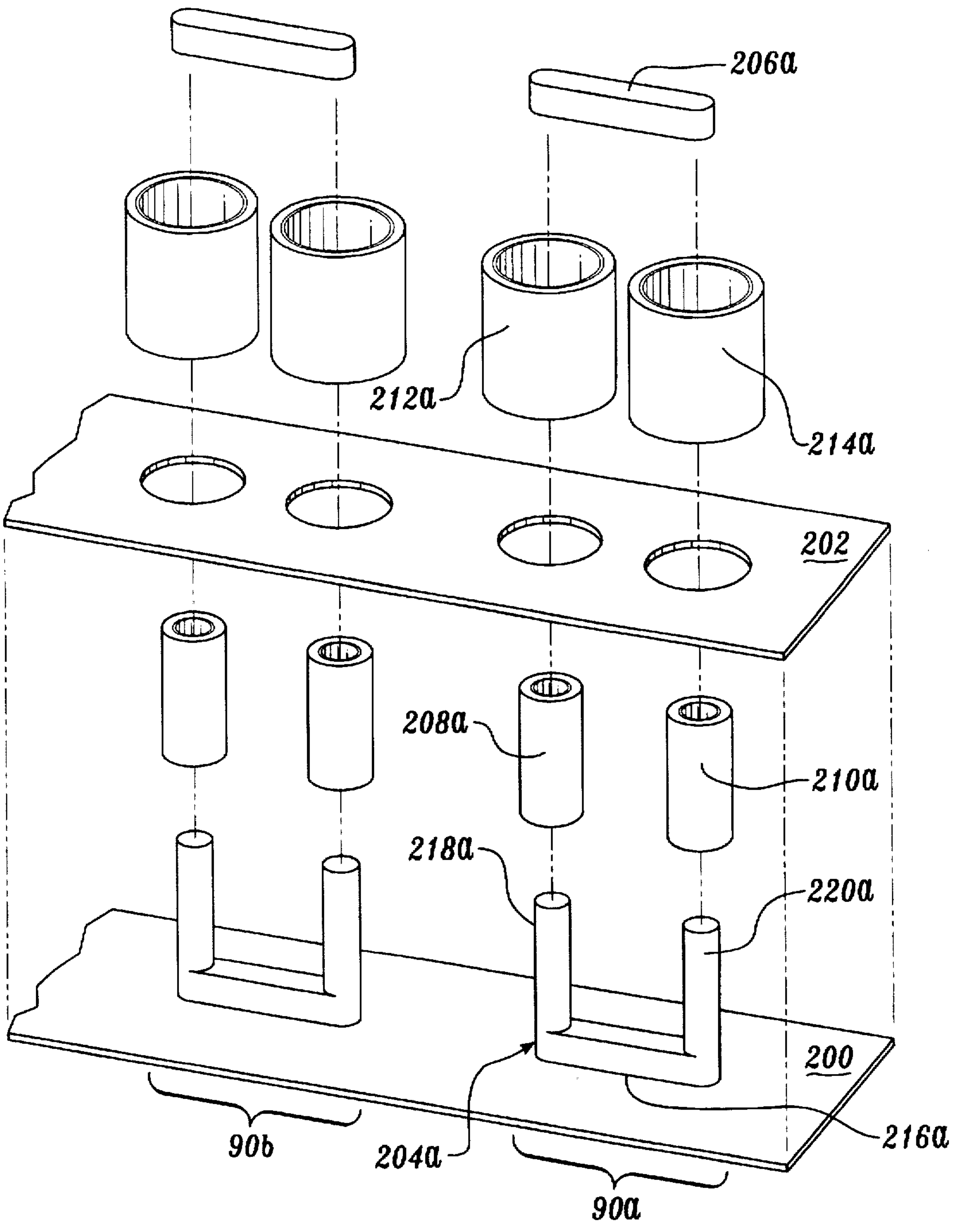
FIG. 6 is a top perspective of two stages of a second embodiment of the high voltage transformer module with the component parts shown in exploded relationship.

A second embodiment of high voltage transformer module 50 is shown in FIG. 6. It will be appreciated that the preferred embodiment of the transformer module, having a pair of high voltage substrates and a pair of low voltage substrates, is simple to construct. The transformer components are merely fastened onto the appropriate substrates, and the substrates "sandwiched" together to complete each module. In the second embodiment of the module represented in FIG. 6, only a single low voltage substrate 200 and a single high voltage substrate 202 are used to mount each transformer stage. The component parts are similar to the preferred embodiment of the transformer module, with each transformer comprising a two-part core **204*a* and 206*a*, primary windings 208*a* and 210*a*, and secondary windings 212*a* and 214*a*. The primary windings are positioned over the core and mounted to the low voltage substrate, and the secondary windings are mounted to the high voltage substrate. In the second embodiment, however, the core halves must be fixed to each other or to the low voltage substrate. As shown in FIG. 6, lower core 204*a* is mounted on the low voltage substrate. The lower core is substantially "U" shaped, with a base 216*a* that is connected to the substrate and two legs 218*a* and 220*a* that extend outward, perpendicularly to the substrate. The upper core is substantially linear, and bridges the distance between each leg of the lower core. Upper core 206*a* must be attached to lower core 204*a*** after the high voltage substrate is appropriately positioned over the low voltage substrate. The configuration shown in the second embodiment therefore adds somewhat to the complexity in constructing the high voltage transformer module.

Figure 7:
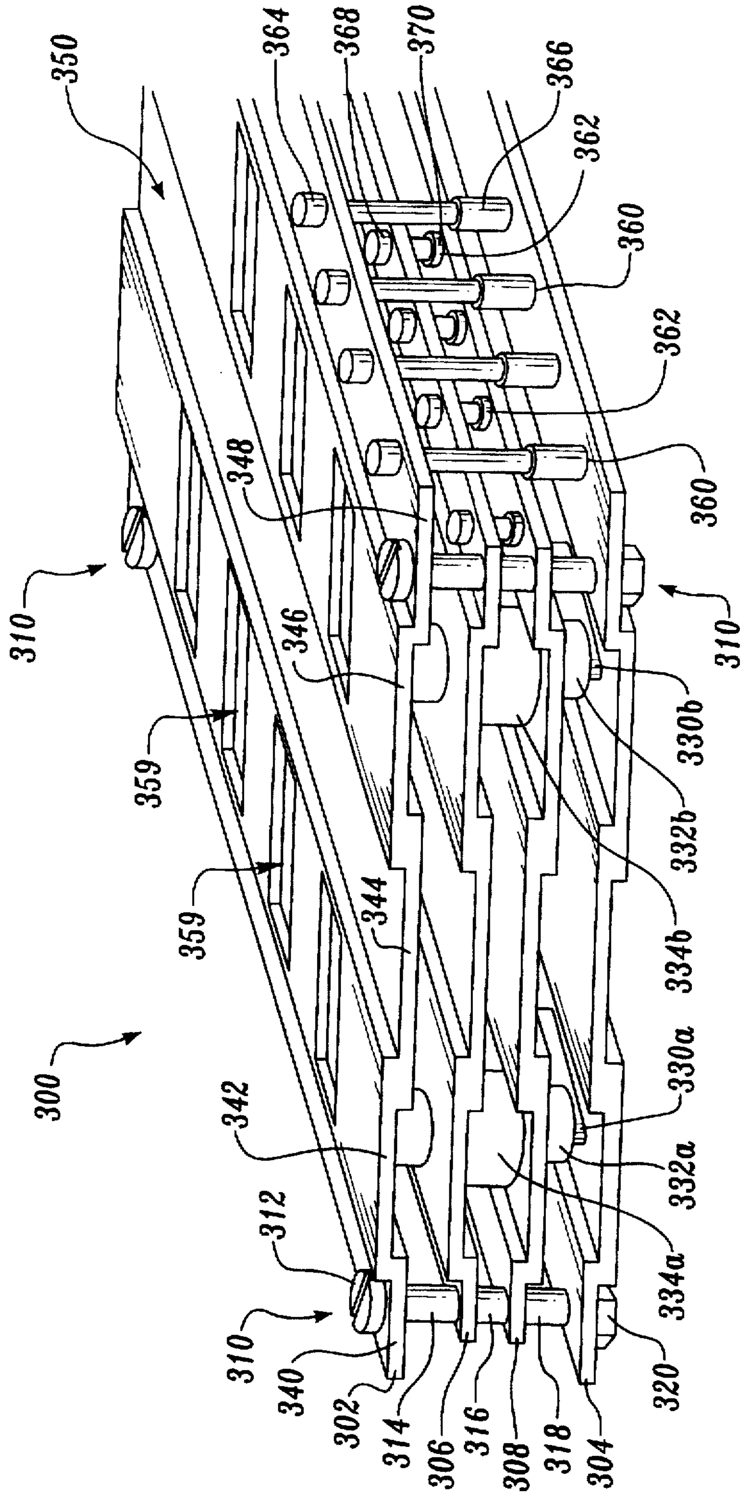
FIG. 7 is a top perspective of a third embodiment of the high voltage transformer module.

A third embodiment of a high voltage transformer module 300 is shown in FIG. 7. Although similar in construction to the preferred embodiment, the third embodiment incorporates many refinements that simplify the assembly of the high voltage transformer module. As in the preferred embodiment, a pair of low voltage substrates 302 and 304 surround a pair of high voltage substrates 306 and 308. The low voltage substrates are attached to, and fixed at a distance from, the high voltage substrates by a number of standoff assemblies 310. Preferably, each standoff assembly comprise a bolt 312, spacers 314, 316, 318, and a nut 320. The spacers 314, 316 and 318 are nonconductive tubes. To fasten the transformer module together, bolt 312 is inserted through a hole in high voltage substrate 302, through spacer 314, through a hole in substrate 306, through spacer 316, through a hole in substrate 308, through spacer 318, and finally through a hole in substrate 304. The assembly is then secured by the attachment of nut 320 to the bolt. The spacing between the substrates is maintained by the spacers 314, 316, and 318 between the substrates. The size of each of the spacers is selected to ensure that appropriate spacing is maintained between all of the substrates. Preferably, one standoff assembly is incorporated into the high voltage transformer module at each corner of the module. Depending upon the size of the high voltage transformer module, however, additional standoff assemblies can be added to ensure that appropriate spacing is maintained between the substrates over the area of the high voltage transformer module.

Fixed between the high voltage and the low voltage substrates are a plurality of transformer stages. Portions of two of the stages are shown in FIG. 7. As in the preferred embodiment, each of the stages comprises a core **330*a*, 330*b* mounted on the low voltage substrates 302 and 304. Primary windings 332*a* and 332*b* are positioned over cores 330*a* and 330*b*. Secondary windings 334*a* and 334*b* are mounted between the high voltage substrates 306 and 308**. The secondary windings surround the primary windings and the cores so that current flowing through the primary winding will induce a stepped-up voltage in the secondary winding. It will be appreciated that the construction of each transformer stage may further be varied as discussed in detail above.

The size of the nonconductive spools used to manufacture the primary and the secondary windings is fixed due to the number of turns that must be incorporated in each of the windings. To minimize the overall size of the high voltage transformer module, the high voltage substrates and the low voltage substrates are therefore shaped to maximize the number of components that may be contained within the form factor embodied by the high voltage transformer module. Preferably, the high voltage and low voltage substrates are shaped so that their cross section resembles a square wave in appearance. A representative cross section of the substrate may be seen in FIG. 7 in the edge of low voltage substrate 302. The outer portions 340 and 348 of the low voltage substrate are constructed in the same plane with the center portion 344 of the substrate. Two raised portions 342 and 346 are located between the outer and center portions. Since the low voltage substrates 302 and 304 are mounted with the raised portions facing away from the high voltage substrates, the distance between the low voltage substrates is increased. The greater distance between the low voltage substrates accommodates the size of the primary transformer windings positioned between the two' raised portions. The two raised portions also create a channel 350 that runs the length of the substrate between the two raised portions. Low voltage components can be mounted within the channel 350 in a manner so that they do not protrude above the raised portions 342 and 346. The stepped substrate construction minimizes the overall size of the high voltage transformer module by providing sufficient substrate space so that low voltage components do not have to be mounted on the raised portions 342 and 346. A similar stepped construction is used for the high voltage substrates 306 and 308 to create additional space for the mounting of high voltage components.

The third embodiment of the high voltage transformer module is constructed with two parallel rows of transformer stages. The use of two parallel rows, rather than a single row, further minimizes the overall size of the high voltage transformer module. To prevent shorting between each of the parallel rows of transformers, the transformer rows are separated by a sufficient distance that varies depending on the anticipated operating voltage. While two rows are shown in the third embodiment, it will be appreciate that the transformer module construction can be expanded to accommodate additional transformer rows. For example, the high voltage transformer module may be constructed with nine transformer stages arrayed in a 3×3 grid.

In certain environments it would not be necessary to incorporate the high voltage transformer module 300 within a case. For example, depending upon the operating voltage of the high voltage transformer module, air may act as sufficient insulation between the high and low voltage substrates. If the high voltage transformer module were used in a vacuum, it would also not be necessary to fill the cavities between the high and low voltage substrates with an additional insulating material. In these environments, the high voltage transformer module 300 may therefore be mounted without a case near the components of the particular application.

In other environments noted above, however, it is desirable to fill the cavities between the high and low voltage substrates with a nonconductive material. When the cavities are filled with a liquid insulation such as mineral oil, preferably the high and low voltage substrates are vertically mounted within the case containing the liquid. That is, the high voltage transformer module 300 should be rotated 90° from the horizontal position shown in FIG. 7. When mounted vertically within a case containing liquid insulation, the liquid will be allowed to circulate within the case during operation of the high voltage transformer module. The liquid insulation is heated during module operation, causing the liquid to rise between the low and high voltage substrates until it reaches the top of the case. At the top of the case, the liquid cools and is recirculated within the case. The natural currents which occur in this process cool the transformer components and prevent the high voltage transformer module from overheating. Additional cooling slots 359 may also be formed in the low voltage substrates to allow circulating insulation to contact and cool the transformer cores. It will be appreciated that in certain applications additional cooling may be required, such as by pumping the liquid insulation through the high voltage transformer module with a pump or providing an external cooling means for the liquid insulation. Most applications will not, however, require such additional cooling methods.

As discussed above, one of the advantages of the disclosed transformer module construction is the ability to quickly assemble the module with minimal labor. The assembly of the third embodiment of the high voltage transformer module 300 is further simplified by the addition of conductive bridges between each substrate pair. The low voltage substrates 302 and 304 are electrically connected by a plurality of conductive bridges 360. The high voltage substrates 306 and 308 are similarly connected by a plurality of conductive bridges 362. The use of conductive bridges simplifies making electrical connections between the components contained on the low voltage substrate pairs and the high voltage substrate pairs. Preferably, the conductive bridges are banana plugs. Plug members 364 are fixed on low voltage substrate 302, and corresponding sockets 366 are fixed on low voltage substrate 304. Similarly, plug members 368 are fixed on high voltage substrate 306 and corresponding sockets 370 are fixed on high voltage substrate 308. The portions of the conductive bridges are each fixed to the respective substrate prior to assembly of the high voltage transformer module. Assembly of the module entails securing the four substrates together with the standoff assemblies. As the substrates are secured together, the plug of each conductive bridge is automatically brought into mechanical and electrical contact with the corresponding socket. Electrical connections between the substrates are therefore automatically made without having to solder wires or use other labor-intensive connection methods. To accommodate the connection between the low voltage substrates, the width of the high voltage substrates 306 and 308 is less than the width of the low voltage substrates 302 and 304. The reduced width allows the conductive bridges to span the distance between the low voltage substrates without coming into contact with the high voltage substrates.

The construction of the high voltage transformer module disclosed herein provides significant advantages in assembly time over those constructions known in the prior art. The automatic positioning of the substrates at appropriate distances from each other, and the automatic alignment and completion of electrical connections between the substrates greatly improves the module assembly time. The assembly time is further improved with the transformer spool construction shown in FIG. 8.

Figure 8:
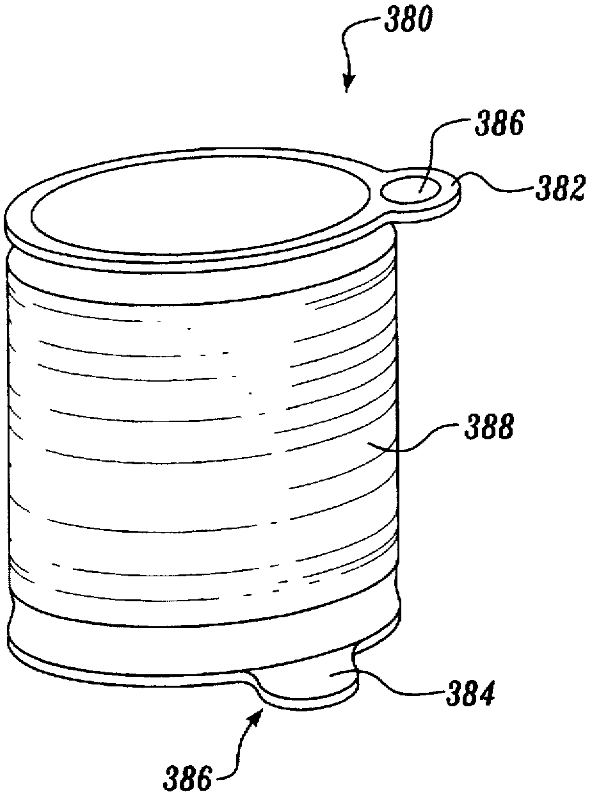
FIG. 8 is a top perspective of a winding and spool construction used in the high voltage transformer module.

FIG. 8 is a perspective view of a spool 380 that may be used to construct the primary or secondary windings in a transformer stage. As noted above, the spools are nonconductive and formed of electrically insulating and nonmagnetic material such as nylon or delrin. The spool is constructed with a first tab 382 and a second tab 384 that protrude from the end of the spool in a plane that is parallel with the spool end. Each tab is integrally formed with the spool, and constructed of the same material as the spool. A conducting pad 386 is constructed on each tab, oriented to face the substrate abutting the end of the spool. The conductive pads are electrically connected to a winding 388 that surrounds the spool. Preferably, each end of the winding is soldered to the conductive pad after the winding is wrapped around the spool. An electrical path is therefore created between the two conductive pads on the spool through the winding.

The high and low voltage substrates in the high voltage transformer module are constructed with similar conductive pads on the side of each substrate facing the spool. During the assembly process, the spools are appropriately aligned on a lower substrate. The alignment may be done by visual markings, alignment ridges, or other similar structures that correctly orient the spool on the substrate. When the upper substrate is placed on top of the spool, compressing the spool between the two substrates, the conductive pads on the substrates are brought into contact with the conductive pads on the spool. An electrical connection is thereby completed between the substrates and the spool winding. It will be appreciated that appropriate circuitry may then be coupled via conductive traces on the substrates to connect the multiple transformer stages as discussed above. The spool construction disclosed in FIG. 8 therefore decreases the assembly time by allowing a manufacturer to electrically connect with the transformer windings without having to individually wire each of the transformer windings to the substrates.

Several advantages arise from the high voltage isolating transformer module construction disclosed herein. A primary advantage is that the number of stages that may be incorporated in each module may be varied to produce a desired output voltage. In a preferred embodiment of the invention the module may be expanded to contain up to twenty transformer stages. A user may therefore select a module design which produces an appropriate output voltage for the user's particular application.

An additional advantage of the module disclosed herein is that components coupled to the transformer in each stage of the module may be mounted on an appropriate substrate depending on their operating voltage. If they are connected to the primary winding of each transformer the components may be mounted on the low voltage substrates, and if connected to the secondary winding of each transformer, they may be mounted on the high voltage substrates. Unlike the prior art designs which mounted the high and low voltage components on the same substrate, the present design ensures that the high voltage components will be electrically as well as physically isolated from the low voltage components.

A further advantage of the preferred construction disclosed herein is that the total output voltage produced by the high voltage transformer module is divided into a number of lesser voltages produced by each stage. The reduced voltage that must be generated by each transformer improves the lifespan of the transformer insulation by reducing the twisting of the insulation dipoles. The reduction in the amount that each transformer must step-up the input voltage also reduces the reflected capacitance of the secondary winding. A smaller inductor may therefore be placed in series with the secondary winding of each transformer stage, reducing the size of the module.

While the preferred embodiment of the invention has been illustrated and described, it will be appreciated that various changes can be made therein without departing from the spirit and scope of the invention. Those skilled in the art will appreciate that while the preferred embodiment of the invention incorporates rectifiers on the outputs from each of the transformers, the rectifiers may be removed and other circuits added to the inputs and the outputs of the transformers. For example, voltage filters, multipliers, and regulators may be connected across the inputs or outputs of each transformer.

It will also be appreciated that within a given module, any number of transformers may be connected in cascode. At one extreme, corresponding to the preferred embodiment, each transformer/rectifier pair is connected in cascode to produce a maximum output voltage from the module. At the other extreme, separate output terminals may be provided for each transformer so that they may be individually used in a circuit requiring multiple transformers to step-up or step-down a number of voltage sources.

Those skilled in the art will further recognize that while all the cavities in the preferred embodiment of the invention are filled with the same type of insulation, the high voltage transformer module would operate with different types of insulation filling each cavity. Consequently, within the scope of the appended claims it will be appreciated that the invention can be practiced otherwise than as specifically described herein.

The embodiments of the invention in which an exclusive property or privilege is claimed are defined as follows:

1. A transformer module comprising:

(a) a first substrate formed with a plurality of holes;

(b) a second substrate;

(c) standoff means supporting the first and second substrates and fixing the first substrate at a distance from the second substrate;

(d) a plurality of transformer stages mounted on the first and second substrates, each of the plurality of transformer stages comprising:

(i) a core mounted on the second substrate, the core extending through the plurality of holes in the first substrate;

(ii) a primary winding surrounding the core; and (iii) a secondary winding mounted on the first substrate, the secondary winding surrounding the core at a distance, wherein a current through the primary winding will induce a current through the secondary winding and generate a voltage across the transformer stage; and (e) insulation for insulating the primary winding and the core from the secondary winding.

2. The transformer module of claim 1, wherein at least two of the plurality of transformer stages are connected so that the voltage generated across the connected transformer stages is combined to produce an output voltage for the transformer module.

3. The transformer module of claim 1, wherein each of the plurality of transformer stages further comprises a conditioning circuit connected across the secondary winding.

4. The transformer module of claim 3, wherein the conditioning circuit is mounted on the first substrate.

5. The transformer module of claim 3 wherein the conditioning circuit is a full bridge rectifier.

6. The transformer module of claim 5, wherein an output from each full bridge rectifier is combined so that the output voltage is equal to a sum of the output voltages produced by each full bridge rectifier.

7. The transformer module of claim 1, further comprising a case surrounding the first substrate, the second substrate, the standoff means, and the plurality of transformer stages.

8. The transformer module of claim 1, wherein a cavity bounded by the first substrate and the second substrate is filled with insulation.

9. The transformer module of claim 8, wherein the insulation has a high breakdown voltage.

10. The transformer module of claim 9, wherein the insulation is mineral oil.

11. The transformer module of claim 7, wherein the standoff means are parallel slots formed in opposing walls of the case.

12. The transformer module of claim 1, wherein the standoff means comprises:

(a) a plurality of spacers; and (b) means to secure the plurality of spacers between the first and the second substrates to maintain the distance between the first and second substrates.

13. A transformer module comprising:

(a) a pair of high voltage substrates formed with a plurality of holes;

(b) a pair of low voltage substrates;

(c) standoff means supporting the pair of high voltage substrates and the pair of low voltage substrates, the pair of high voltage substrates located adjacent each other and maintained a distance apart by the standoff means, the pair of low voltage substrates surrounding the pair of high voltage substrates and maintained at a distance from the pair of high voltage substrates by the standoff means;

(d) a plurality of transformer stages mounted on the pair of high voltage substrates and the pair of low voltage substrates, each of the plurality of transformer stages comprising:

(i) a core mounted on the pair of low voltage substrates, the core extending between the pair of low voltage substrates and passing through the plurality of holes in each of the pair of high voltage substrates;

(ii) a primary winding surrounding the core; and (iii) a secondary winding mounted between the pair of high voltage substrates, the secondary winding surrounding the core at a distance, wherein a current through the primary winding will induce a current through the secondary winding and generate a voltage across the transformer stage; and (e) insulation for insulating the primary winding and the core from the secondary winding.

14. The transformer module of claim 13, wherein the plurality of transformer stages are connected such that the voltage generated across each of the plurality of transformer stages is combined to produce a total output voltage.

15. The transformer module of claim 13, wherein each of the plurality of transformer stages further comprises a conditioning circuit connected across the secondary winding.

16. The transformer module of claim 15, wherein the conditioning circuit is mounted on one of the pair of high voltage substrates.

17. The transformer module of claim 15, wherein an output from each conditioning circuit is connected so that the total output voltage is equal to a sum of the output voltage produced by each conditioning circuit.

18. The transformer module of claim 17, wherein the conditioning circuit is a full bridge rectifier.

19. The transformer module of claim 13, further comprising a case surrounding the pair of high voltage substrates, the pair of low voltage substrates, the standoff means, and the plurality of transformer stages.

20. The transformer module of claim 13, wherein an inner cavity bounded by the pair of high voltage substrates, and intermediate cavities bounded by the pair of high voltage substrates and the pair of low voltage substrates, are filled with insulation.

21. The transformer module of claim 20, wherein the insulation has a high breakdown voltage.

22. The transformer module of claim 20, wherein the insulation is mineral oil.

23. The transformer module of claim 19 wherein the standoff means is parallel slots formed in opposing walls of the case.

24. The transformer module of claim 13, wherein the standoff means comprises:

(a) a plurality of spacers; and (b) means to secure the plurality of spacers between the pair of high voltage substrates, and between the pair of low voltage substrates and the pair of high voltage substrates, in order to maintain the distance between the low and high voltage substrates.

25. The transformer module of claim 13, further comprising conductive bridges between the pair of low voltage substrates.

26. The transformer module of claim 13, further comprising conductive bridges between the pair of high voltage substrates.

27. A transformer module comprising:

(a) a first substrate formed with a plurality of holes;

(b) a second substrate located at a fixed distance from the first substrate;

(c) a plurality of transformer stages mounted on the first and second substrates, each of the plurality of transformer stages comprising:

(i) a core mounted on the second substrate, the core extending through the plurality of holes in the first substrate;

(ii) a primary winding surrounding the core; and (iii) a secondary winding mounted on the first substrate, the secondary winding surrounding the core at a distance, wherein a current through the primary winding will induce a current through the secondary winding and generate a voltage across the transformer stage, and (d) insulation for insulating the primary winding and the core from the secondary winding.

28. The transformer module of claim 27, wherein at least two of the plurality of transformer stages are connected so that the voltage generated across the connected transformer stages is combined to produce an output voltage for the transformer module.

29. The transformer module of claim 27, wherein each of the plurality of transformer stages further comprises a conditioning circuit connected across the secondary winding.

30. The transformer module of claim 29, wherein the conditioning circuit is mounted on the first substrate.

31. The transformer module of claim 29 wherein the conditioning circuit is a full bridge rectifier.

32. The transformer module of claim 31, wherein an output from each full bridge rectifier is combined so that the output voltage is equal to a sum of the output voltages produced by each full bridge rectifier.

33. The transformer module of claim 27, further comprising a case surrounding the first substrate, the second substrate, and the plurality of transformer stages.

34. The transformer module of claim 27, wherein a cavity bounded by the first substrate and the second substrate is filled with insulation.

35. The transformer module of claim 34, wherein the insulation has a high breakdown voltage.

36. The transformer module of claim 35, wherein the insulation is mineral oil.

37. The transformer module of claim 33, further comprising a standoff means supporting the first and second substrates and fixing the first substrate at a distance from the second substrate.

38. The transformer module of claim 37, wherein the standoff means are parallel slots formed in opposing walls of the case.

39. The transformer module of claim 27, further comprising a standoff means supporting the first and second substrates and fixing the first substrate at a distance from the second substrate.

40. The transformer module of claim 39, wherein the standoff means comprises:

(a) a plurality of spacers; and (b) means to secure the plurality of spacers between the first and the second substrates to maintain the distance between the first and second substrates.

* * * * *